United States Patent [19]

Watson

[11] Patent Number: 4,820,886
[45] Date of Patent: Apr. 11, 1989

[54] LOW-COST, HIGH-ACCURACY DIGITIZER SIGNAL ACQUISITION APPARATUS AND METHOD

[75] Inventor: James S. Watson, Phoenix, Ariz.

[73] Assignee: Sanders Associates, Inc., Nashua, N.H.

[21] Appl. No.: 140,648

[22] Filed: Jan. 4, 1988

Related U.S. Application Data

[63] Continuation-in-part of Ser. No. 26,217, Mar. 16, 1987, Pat. No. 4,734,546.

[51] Int. Cl.$^4$ ............................................. G08C 21/00
[52] U.S. Cl. ........................................................ 178/19
[58] Field of Search ..................................... 178/19, 18

[56] References Cited

U.S. PATENT DOCUMENTS 4,694,124 9/1987 Blesser ................................. 178/19

Primary Examiner—Stafford D. Schreyer
Attorney, Agent, or Firm—Donald A. Streck; Wm. F. Porter, Jr.

[57] ABSTRACT

An improvement to position digitizing devices wherein sensed response voltages caused by the interaction of a movable instrument relative to conductors beneath a planar surface are converted to digital form and digitally processed to determine instrument position. An integrating voltage to frequency converter is used to produce a frequency with a correspondence to the voltage applied to it. By counting the frequency for a defined length of time, a resultant count is obtained which also corresponds to the applied voltage. By varying the counting period under microprocessor control, acquisition rate and resolution can be varied over several orders of magnitude without changing circuit components. The digitizer includes conductive elements disposed across the digitizing surface and incorporated into an instrument for producing an analog voltage signal having a DC component related to the position of the instrument on the digitizing surface. There is a voltage to frequency converter for receiving the analog voltage signal and for converting it to a pulsed signal at a frequency which is a monotonically increasing or decreasing function of the voltage level of the analog voltage signal. There is a counter for receiving the pulsed signal from the voltage to frequency converter, for counting the pulses of the pulsed signal, and for producing a digital value output proportional to the counted pulses whereby the digital value is similarly related to the voltage level of the analog voltage signal.

27 Claims, 4 Drawing Sheets

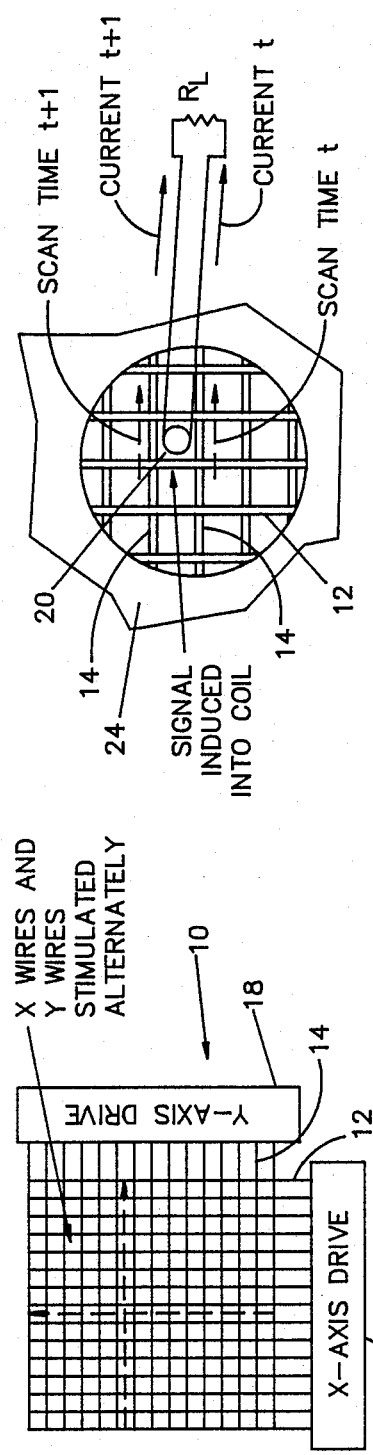
FIG. 1 PRIOR ART
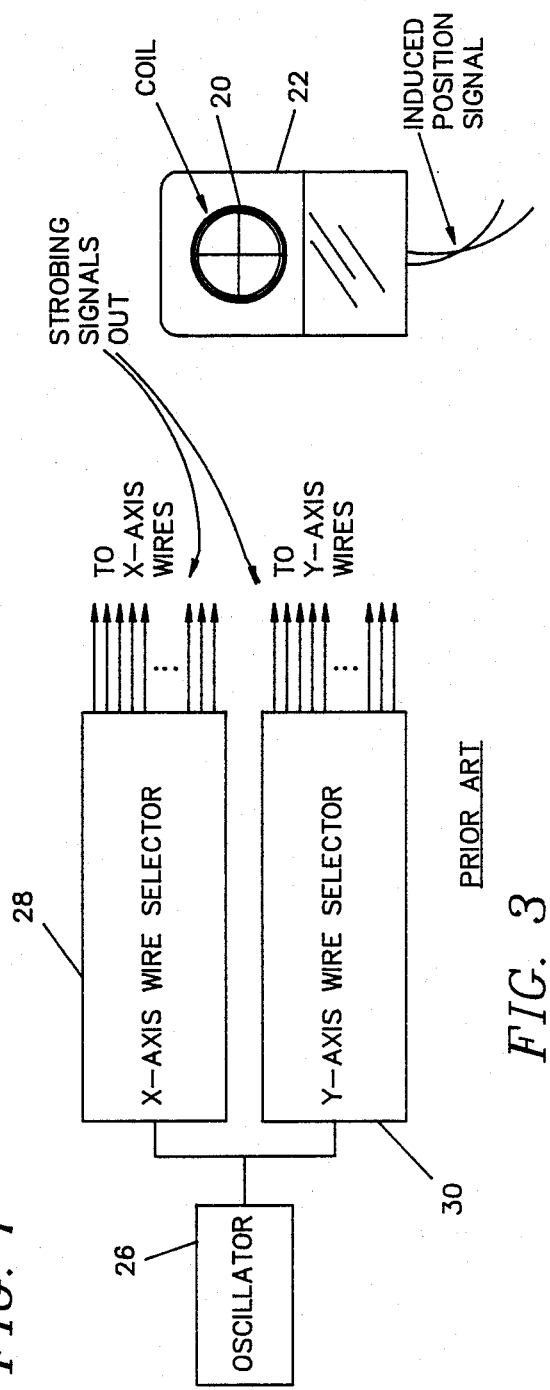
FIG. 2 PRIOR ART
FIG. 3 PRIOR ART

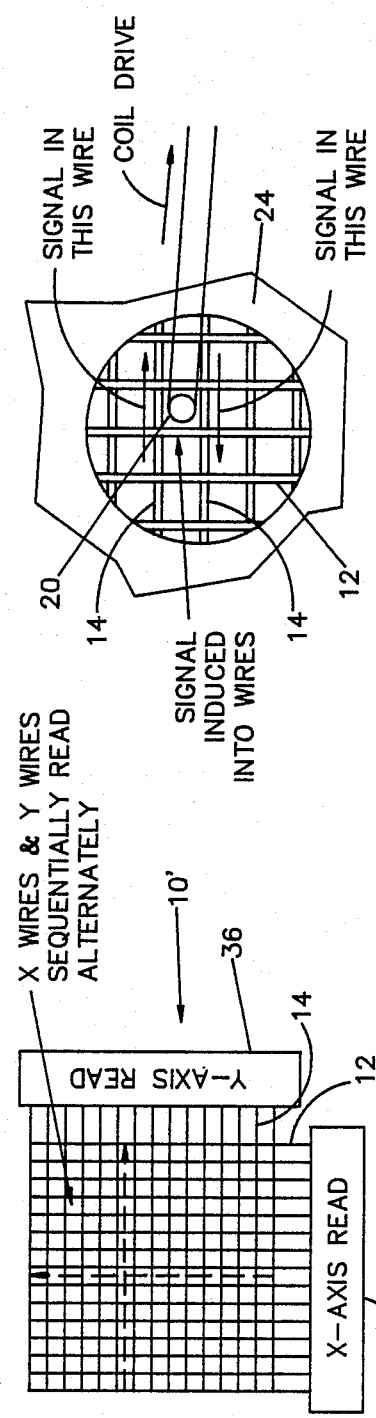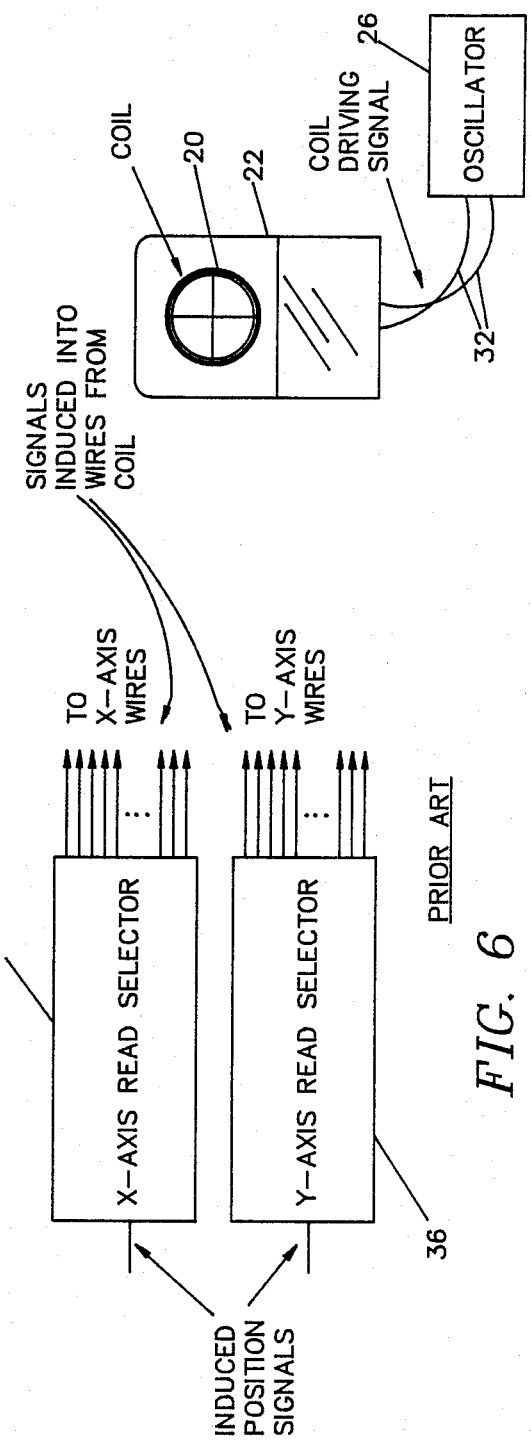

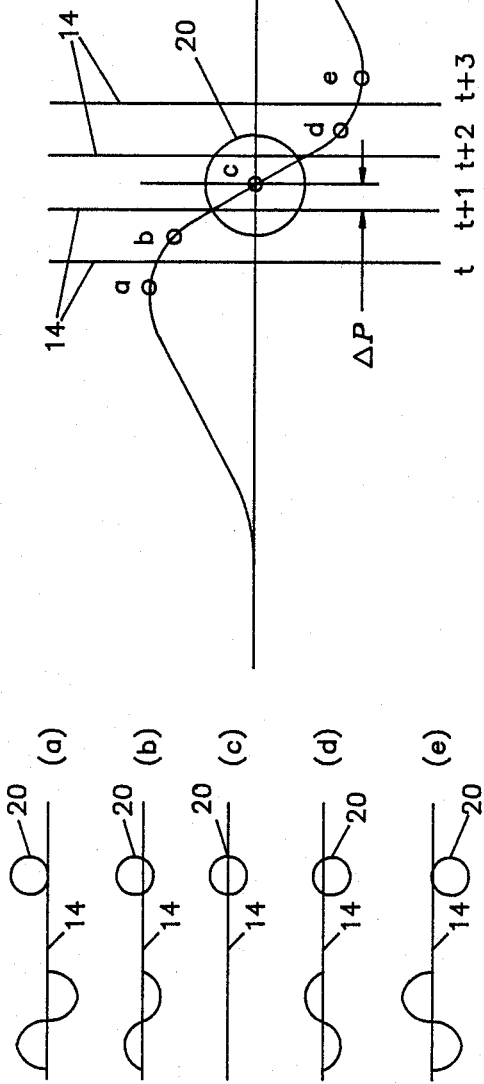
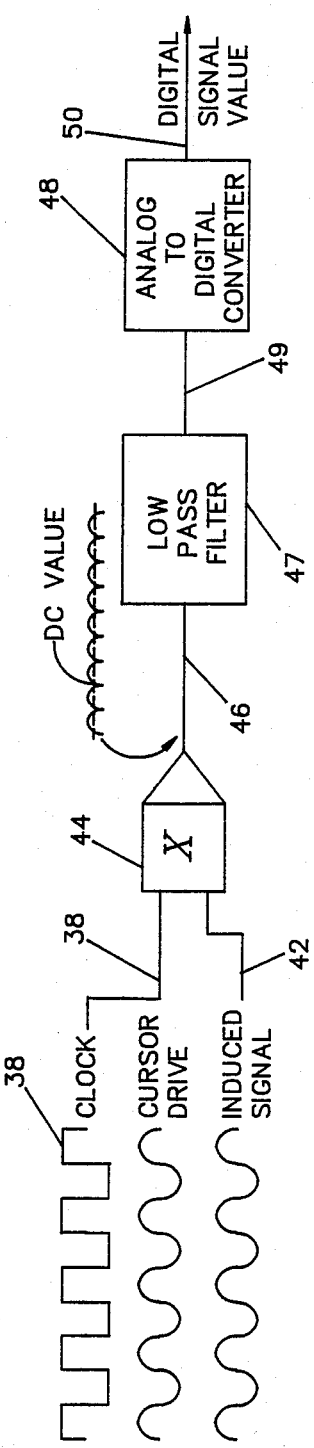
FIG. 7
FIG. 8
FIG. 9 PRIOR ART

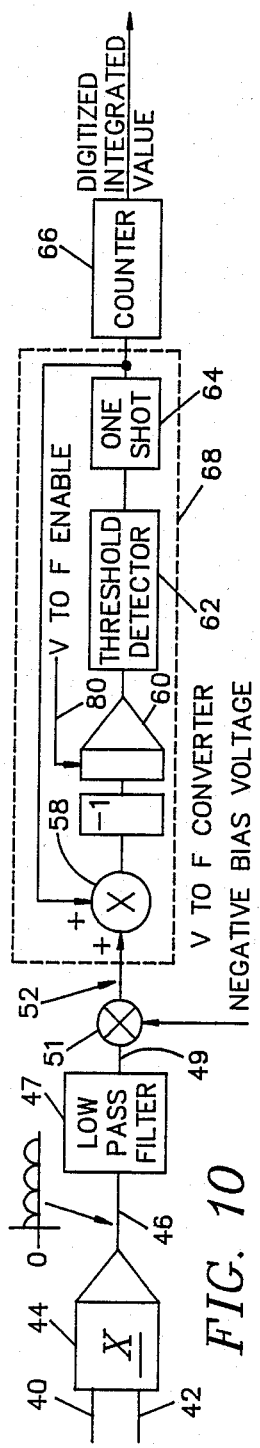
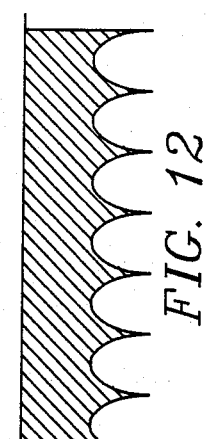
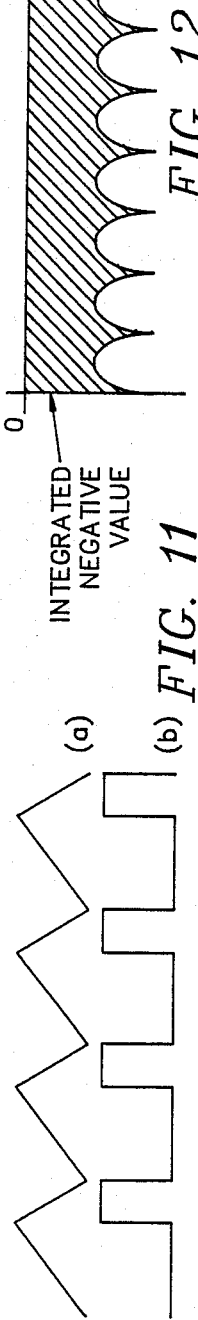
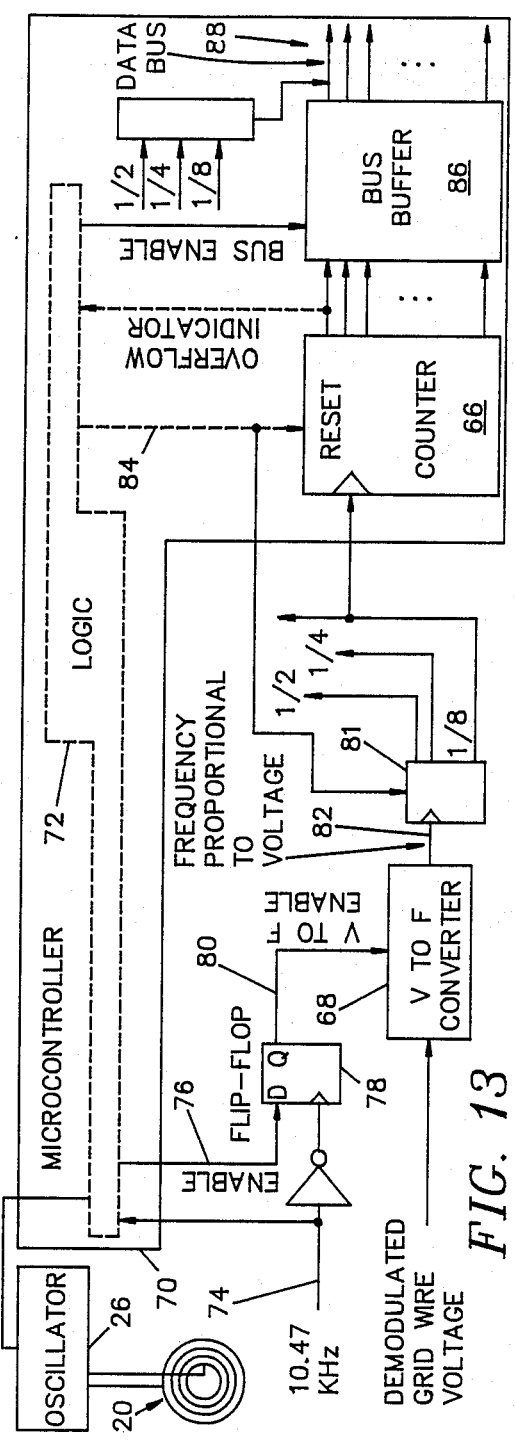

LOW-COST, HIGH-ACCURACY DIGITIZER SIGNAL ACQUISITION APPARATUS AND METHOD

BACKGROUND OF THE INVENTION:

This application is a Continuation-In-Part of application Ser. No. 026,217 filed Mar. 16, 1987 entitled DIGITIZER SYSTEM WITH LOOPBACK CONDUCTOR GRID, which is also assigned to the common assignee of this application, now U.S. Pat. No. 4734546, issued Mar. 29, 1988.

The present invention relates to digitizers as employed to input x,y positional data to computers, and the like, and, more particularly, in a digitizer having one or more conductors disposed across an area and instrument moved across the area to selected positions to be digitized and producing an analog voltage signal having a DC component related to the position of the instrument, to the improvement for producing a digital value from the signal dependent on the position of the instrument on the area comprising, voltage to frequency conversion means for receiving the analog voltage signal and for converting it to a pulsed signal at a frequency which is a monotonically increasing or decreasing function of the voltage level of the analog voltage signal; and, counter means for receiving the pulsed signal from the voltage to frequency conversion means, for counting the pulses of the pulsed signal for an interval, and for producing at an output thereof a digital value proportional to the pulse count whereby the digital value is a monotonically increasing or decreasing function of the voltage level of the analog voltage signal.

Digitizers (whether large or small) provide a convenient method for inputting two-dimensional graphics data into a computer. In a typical digitizer, induced voltages are employed to determine the position of a cursor on the digitizer's surface. The positional sensing through the use of induced voltages may be accomplished in many different ways, two of which are shown by FIGS. 1-3 and FIGS. 4-6. Referring first to FIGS. 1-3, the digitizer 10 comprises a grid of vertical X wires 12 and horizontal Y wires 14. An X-axis drive 16 stimulates the X wires 12 while a Y-axis drive 18 stimulates the Y wires 14. In this embodiment, the wires 12, 14 are energized and the positional signal is induced into a coil 20 contained within cursor 22, which is moved over the surface 24 covering the wires 12, 14. An oscillator 26 is connected to drive an X-axis wire selector 28 and a Y-axis wire selector 30 which are connected to the wires 12, 14, respectively, to sequentially apply signals first to the wires 12, then to the wires 14, and repeating. As shown in FIG. 2, a current flowing through a wire 14 below the coil 20 at time t induces a current into the coil 20 in one direction while the current flowing through the wire 14 above the coil 20 at time t+1 induces a current in the opposite direction. It is this change in current direction (as sensed in the load resistor $R_L$ which is employed to determine the position of the coil 20 in a manner to be described in greater detail hereinafter.

In the alternate approach as shown in FIGS. 4-6, the oscillator 26 is connected to wires 32 of the cursor 22 so that the coil 20 is the driven element causing signals to be induced into the wires 12, 14 nearest the coil 20. An X-axis read selector circuit 34 and a Y-axis read selector circuit 36 are connected to the wires 12, 14, respectively, and read the wires 12, 14 to determine the signals induced therein and, thereby, the position of the cursor 22 and coil 20 carried thereby.

Turning now to FIG. 7, assuming a sinusoidally driven coil as in the embodiment of FIGS. 4-6, one cycle of the signal induced into a wire 14 as the coil 20 is moved across it from top to bottom is shown. In FIG. 7a, the portion of the bottom half of the coil 20 tangent to the wire 14 is directly above wire 14 and, therefore, induces a maximum signal therein. As the coil moves across the wire 14 as depicted in FIG. 7b, the signal reduces in amplitude. As the coil 20 achieves a position equally divided by the wire 14 as depicted in FIG. 7c, the signal amplitude goes to zero. As the coil 20 continues across the wire 14 to the opposite side as shown in FIGS. 7d and 7e, the signal increases in amplitude to its maximum amplitude; however, it will be noted that the phase thereof is reversed. The magnitude and phase of the AC voltage induced in the wire by the coil current as a function of displacement of the center of the coil 20 from the wire 14 is shown in FIG. 8 wherein the points on this characteristic curve corresponding to each of the conditions shown in FIG. 7 are labelled. As indicated in FIG. 8, the wires 14 are sensed in time sequence t, t+1, t+2, and t+3 with the coil 20 positioned between wires 14 for times t+1 and t+2 at a distance of delta P from the wire energized at time t+1. As can be seen, the signal changes phase and passes through "zero" at the midline of the coil 20. By determining the value of delta P, the specific position of the coil 20 can be determined. This is done by interpolation techniques well known to those skilled in the art. Where an output resolution of 200-400 lines per inch is desired, interpolation between the relatively widely spaced wires 12 and 14 (typically 0.2-0.4 inches apart) is not a major problem. Where resolution in the neighborhood of 1000 lines per inch is desired, however, the stability of the interpolated value is a function of the stability of the voltage signals being interpolated; that is, as with any mathematical calculation, the end product is only as accurate as the data which goes into it. Thus, if the voltage signals being processed to solve for the zero crossing are fluctuating, the determination of the point at which the signal changes phase and passes through zero tends to fluctuate as well.

One prior art approach to developing the digital value of the voltage which is then analyzed to determine coil position (corresponding to the technology of Bergeron U.S. Pat. No. 4,423,286) is shown in FIG. 9. The coil 20 is energized by a sinusoidal signal in phase with a square wave clock signal 38 from the oscillator 26. The clock's signal on line 38 is combined with the induced signal on a wire 12, 14 as appearing on line 42 at 44 by a synchronous demodulator to produce an output at 46 having AC ripple components and a DC component which is lowpass filtered at 47 to remove as much of the ripple component as possible and then converted to a digital equivalent by analog-to-digital converter 48. The output 50 from the analog-to-digital converter 48 is the digital signal value employed in the calculation of the position of the coil 20.

A disadvantage of the foregoing procedure is that the voltage cannot be sampled until the residue from the previously sampled wire has effectively decayed away. While it is desirable to make the corner frequency of the filter 47 as low as possible to remove as much random noise and ripple from the signal as possible, a low corner frequency will increase the time required for the signal to reach a new steady state value. Once a filter is selected which achieves acceptable ripple/noise rejection and stabilization time for a given wire sample, reducing the wait time prior to A to D conversion introduces residue from the previous wire while increasing the wait time yields no improved resolution.

Another prior art technique as typified by the Blesser et al. U.S. Pat. No. (4,644,102), overcomes this problem to a degree, by using a finite time integrator as the low pass filter 47 of FIG. 9. The process works by resetting the integrator to remove the previously sampled wire residue, integrating for a controlled period and then holding the integrated value to be converted by the A to D converter to digital form. This method utilizes the wire response signal for all of the time possible except for the time when the A to D converter is converting the signal. This method has the capability to trade off rate for resolution performance by varying the integration time; however, an upper limit to obtainable resolution exists due to the quantization of the A to D converter.

Another similar prior art method is dual slope integration. Under this method, an integrator is reset, and the amplified, demodulated response signal is integrated for a controlled time. After this, a signal of known constant value and opposite polarity is applied to the integrator. The time required for the known signal to reduce the integrator output to zero is proportional to the magnitude of the response signal. By varying the integration time under this method, a significant tradeoff of rate for resolution is possible; but, resolution is limited by the rate of the clock used to time the integration back to zero. This prior art method has the further advantage of not requiring an A to D converter IC; but, has the corresponding disadvantage that time, which could be spent utilizing the available response signal, is spent on the integration back to zero.

Wherefore, it is an object of the present invention to provide a digitizer wherein response signals are converted to digital form with a technique that utilizes all the response energy that is available.

It is a further object of the present invention to provide a digitizer which performs the A to D conversion with a technique that has no circuit component limitations on the resolution which may be achieved.

It is yet another object of the present invention to extend the rate/resolution performance envelope of a digitizer by providing the capability of achieving high resolution via long acquisition time or high data rate via short acquisition time.

It is still another object of the present invention to provide a digitizer which eliminates the need for costly integrated circuit A to D converters where high resolution is required.

Other objects and benefits of the present invention will become apparent from the description contained hereinafter taken in conjunction with the drawing figures which accompany it.

SUMMARY

The foregoing objects have been achieved by the improved digitizer of the present invention for providing a digital value representing the position of a mechanical cursor on a digitizing surface comprising, means disposed across the digitizing surface and incorporated into the mechanical cursor for, in combination, producing an analog voltage signal having a DC component related to the position of the mechanical cursor on the digitizing surface; voltage to frequency conversion means for receiving the analog voltage signal and for converting it to a pulsed signal at a frequency linearly related to the voltage level of the analog voltage signal; and, counter means for receiving the pulsed signal from the voltage to frequency conversion means, for counting the pulses of the pulsed signal for a fixed or variable interval, and for producing at an output thereof a digital value proportional to the counted pulses whereby the digital value is proportional to the voltage level of the analog voltage signal.

In the preferred embodiment, there are also means for resetting the counter means to an initial value at the start of a sampling period. Also in the preferred embodiment, the voltage to frequency conversion means includes integrator and feedback means for causing a train of pulses of fixed width and amplitude to be generated at such a frequency that the time integral of the pulse train voltage is equal to the time integral of the analog voltage signal. The frequency of the pulse train is thus proportional to the voltage of the analog signal.

The preferred integrator means comprises, summing junction means for receiving the voltage level of the analog voltage signal at a first input thereof and for producing the sum of the inputs at the first input and a second input at an output thereof; integrator circuit means having the output of the summing junction means connected to an input thereof and for producing the integrated value of the sum from the summing junction means at an output thereof; and, pulse producing means having the output of the integrator circuit means connected to an input thereof and for producing a single pulse at an output thereof whenever the value at the input of the pulse producing means exceeds a pre-established threshold value, the output of the pulse producing means being connected as the input to the counter means, the output of the pulse producing means also being connected to the second input of the summing junction means.

Additionally in the preferred embodiment, low pass filter means are connected in series with the voltage to frequency conversion means for receiving the voltage signal prior to the voltage to frequency conversion means and for removing a portion of any ripple and AC components from the voltage signal.

The invention is useful in digitizers of the type wherein the cursor is first coarsely located to the region of several of many conductors. Such a digitizer is the subject matter of the above-referenced co-pending application of which this application is a Continuation-In-Part. In this type of operation, voltages on only the nearby conductors are sampled. Having determined the voltage on any conductor, a decision is made regarding which conductor to sample next, then the next voltage is sampled. As soon as it is known which wire voltage must be sampled next, that wire is selected and the count period is initiated. When the time allowed for sampling by the rate/resolution performance mode of operation of the present invention expires, the count period is stopped, the count representative of the voltage is read, and the next wire is selected. Thus, no time is expended waiting for a voltage to ramp back to zero as with the prior art dual slope converter approach; nor is any time expended waiting for an A to D converter IC to change a DC voltage to its digital representation. The object of utilizing all of the response energy that is available is thus inherently achieved.

As will be seen from the detailed description which follows, the time period over which the output frequency of the voltage to frequency (V to F) converter implemented by the present invention is accumulated into a resulting count is variable and entirely under the control of the program in a microcontroller device. The program and operator commands to which the program responds have the capability to control the length of the counting period over several orders of magnitude. Since the resolution increases as the count period increases without any need to change circuit components, the object of a technique which places no circuit component limits on resolution is thus achieved as well.

Since the count period is variable, a short count period will produce a high data rate and low resolution while a long count period will produce a low data rate and high resolution, thus achieving the object of extending the digitizer rate/resolution performance envelope.

A normal resolution requirement for digitizers is 1,000 lines per inch. In a case where the wires are spaced one-half inch apart, the conversion technique employed must be capable of subdividing the voltage change due to one-half inch of transducer movement into at least 500 parts. Depending on which direction the cursor is moved, the change could be either positive or negative. Thus, the range of the voltage expected needs to divide into at least 1,000 parts. To allow for component tolerances, the range should be roughly half again this large or 1,500 parts. To obtain this, the A to D conversion process must have at least this same quantization. Thus, an eleven bit A to D converter would be required. At this range of capability, the cost of the A to D converter is several times that of the circuitry of the preferred embodiment of the present invention. In a typical performance mode, 100 pairs of coordinates per second must be output at a resolution of 1,000 lines per inch. If it is necessary to sample the voltage on two wires per axis to determine transducer position, one wire sampling must be made every 2.5 msec. Some of the time will be spent deciding which wires to sample; so, it is reasonable to assume a sampling time of 2 msec per wire. With a V to F converter which will run at a maximum rate of 1.8 MHz as is easily implementable with the present invention, a count as large as 3,600 can be obtained in the allotted time. The object of eliminating the need for costly integrated circuit A to D converters is thus achieved.

The costs of implementing a V to F converter and a dual slope converter are roughly the same; however, if the same frequency used for the V to F converter to generate its maximum frequency is also used for the dual slope to generate the counts during the integration back to zero, it will be appreciated that the maximum count achievable by the V to F of the present invention will be larger. This is because only part of the time that the response signal is available is spent by the dual slope converter in integrating back to zero while the V to F converter will run at that frequency for all the time when the response signal is available. Thus, the present invention achieves the object of greater resolution at a cost no greater than the dual slope method and at a lower cost than the integrated circuit A to D method.

DESCRIPTION OF THE DRAWINGS

FIG. 1 is a simplified drawing of the grid of wires employed in a digitizer when employing the prior art approach of strobing the wires with a signal to induce a voltage in a coil in the cursor.

FIG. 2 is an enlarged drawing of a portion of the coil of FIG. 1 showing the manner in which the current is induced into the coil.

FIG. 3 is a block diagram of some of the components of a digitizer operating in the manner depicted in FIGS. 1 and 2.

FIG. 4 is a drawing in the manner of FIG. 1 wherein the signal induced into the wires of the grid are read sequentially.

FIG. 5 is a drawing in the manner of FIG. 2 showing how the driven coil induces a signal into the wires of the grid.

FIG. 6 is a drawing in the manner of FIG. 3 showing the components employed when operating a digitizer in the manner of FIGS. 4 and 5.

FIGS. 7a–7e show the development of a signal in a wire as an energized coil is moved across the wire from one side to the other.

FIG. 8 shows the characteristic relationship of AC wire voltage versus wire position relative to an energized coil wherein the voltage changes phase and passes through zero at the midline of the coil.

FIG. 9 shows a prior art apparatus for developing the digital signal value employed to determine coil position.

FIG. 10 is a simplified block diagram of apparatus according to the present invention.

FIGS. 11a and 11b are drawings of the wave forms developed in the apparatus of FIG. 10.

FIG. 12 is a representation of a single voltage wave showing the way the present invention integrates the entire wave to produce an equivalent value of high accuracy.

FIG. 13 is a block diagram of apparatus according to a tested embodiment of the present invention.

DESCRIPTION OF THE PREFERRED EMBODIMENT

According to the present invention as depicted in FIG. 10, the output 49 containing the full-wave demodulated signal of FIG. 9 is biased at 51 so as to always be a negative voltage and is input to a summing junction 58 which is the input to an integrator 60 which, due to its circuit configuration, has a negative gain. The output of the integrator 60 is connected as the input to a threshold detector 62. The output of the threshold detector 62, in turn, is connected to the input of a one-shot multi-vibrator 64. The output of the one-shot multi-vibrator 64 is connected as an input to a digital counter 66 whose output is the digitized integrated value of the signal on line 46. The output from the one-shot multi-vibrator 64 is also connected to an input of the summing junction 58. The operation of the foregoing components can be understood best with reference to FIG. 11. The summing junction 58, integrator 60, threshold detector 62, and one-shot multi-vibrator 64 act as a voltage-to-frequency converter, generally indicated as 68, which drives the counter 66. Since the voltage is converted to frequency, the count value within the counter 66 for each sample period is a digital value directly related to the voltage which produced it. Moreover, it is a function of the area under the signal 52 as depicted in FIG. 12, i.e., the integral of the signal for that period. As those skilled in the art will recognize, this allows data rate/resolution tradeoff that was desired as an object of the present invention as well as the utilization of the signal for the greatest possible fraction of the time for which it is available. If the sampling (integration) time is increased for each wire 12, 14, the data rate will go down; however, the quantization of the values produced will increase allowing greater resolution because the integration goes on for a longer period of time and, therefore, more precisely represents the area under the signal 52. Correspondingly, if the sample time at each wire 12, 14, is reduced, the data rate will increase with a corresponding reduction in the integration time and, therefore, the resolution.

FIG. 11a represents the output of the integrator 60 as a function of time while FIG. 11b represents the output of the one-shot multi-vibrator 64. The voltage rate of the integrator 60 is proportional to the input voltage applied thereto. The greater the voltage, the steeper the slope. When the voltage from the integrator 60 reaches the value of the threshold detector, the one-shot multi-vibrator 64 produces a single square wave pulse. As will be recalled, the output of the one-shot multi-vibrator 64 is summed with the input (i.e., the voltage) on line 49 which has been driving the integrator 60 in a positive direction. This negative feedback drives the output of the integrator 60 in a negative direction until the termination of the single square wave pulse from the one-shot multi-vibrator 64, at which time the voltage on line 49 once again causes the integrator 60 to integrate in a positive direction at a rate determined by the voltage value. The result is a series of square wave pulses as shown in FIG. 11b at a frequency proportional to the voltage on line 49 by virtue of the integration loop's necessity for an average voltage of zero at the integrator input. Thus, as will be readily recognized by those skilled in the art, a less negative voltage on line 49 will produce a lower slope on the signal out of integrator 60 producing outputs from the one-shot multi-vibrator 64 at greater intervals and, therefore, a lesser frequency to produce a lower count within the counter 66. Correspondingly, a greater voltage produces a steeper slope which, in turn, produces the square wave pulses at a higher frequency resulting in a higher count in the counter 66. The HC4538 monostable multivibrator used in this embodiment has a Schmitt trigger input making it rise time insensitive. The threshold detector and the monostable multivibrator reside in the same IC in the preferred embodiment.

The way the foregoing method and apparatus has been implemented in a commercial embodiment of the assignee of the present invention is shown in simplified form in FIG. 13. The counter 66 is contained within a micro-controller 70 which performs various functions within the associated digitizer including the calculations of the cursor position. The micro-controller 70 contains logic 72 which controls the micro-controller 70 to perform its necessary functions. As depicted in FIG. 13, the demodulated, biased grid wire voltage on line 49 is input to the voltage-to-frequency converter 68 previously described with respect to FIG. 10. The entire apparatus is driven by a 10.47 KHz clock frequency appearing as an input at 74. The logic 72 in the micro-controller 70 is capable of enabling the V to F converter 68 for any length of time desired; but, cannot enable the V to F converter 68 for exactly the same length of time for every sample. By sampling the 10.47 KHz clock and changing the state of enable line 76, the logic, in combination with flip-flop 80, causes the V to F converter 68 to be enabled for an exact multiple of the period of the 10.47 KHz clock, with the number of periods being completely controlled by the logic. As a particular wire 12, 14 is to be sampled, the logic 72 sends an enable signal on line 76 to flip-flop 78 which, in turn, enables the voltage-to-frequency converter 68 via line 80. The output from the one-shot multi-vibrator 64 within the voltage-to-frequency converter 68 appearing on line 82 is input to a counter 81 which produces three outputs of $\frac{1}{2}$, $\frac{1}{4}$, and $\frac{1}{8}$ the frequency of line 82. The $\frac{1}{8}$ frequency output is applied to the counter 66 contained within the micro-controller 70 as described above. The counter 81 is required in the commercial embodiment only because the microprocessor counter employed cannot count at a rate higher than 460 KHz while the frequency on line 82 can be as high as 2 MHz. The counters 81 and 66 are reset by the logic 72 via line 84. The output of the counter 66 is connected to a bus buffer 86 whose output is the data bus 88 containing the data which are employed in the calculation process by the logic 72. The output of the counter 81 is also available to the data bus 88. Note that the overflow indicator from the counter 66 is fed to the logic 72 such that reduced data rates producing high resolution with corresponding high count values within the counter 66, which can produce an overflow thereof, can be easily and automatically compensated for by the logic 72 without the necessity of providing additional apparatus for the purpose.

The resultant count in the counter will tend toward zero as the analog signal 49 becomes more positive. The count tends toward the maximum value as the analog signal 49 becomes more negative. The count produced by zero input is obtained by selecting any wire 12, turning off the oscillator 26 which drives the cursor coil 20, and acquiring the resulting count for that wire.

Thus, it can be seen from the foregoing description that the present invention has achieved its desired objectives by providing an improved method and apparatus for producing a digital equivalent value to the voltage signal produced in a digitizer which can be made highly quantized at the sacrifice of data rate or of a high data rate at the sacrifice of resolution.

The invention should not be considered as being limited to the specific embodiment described in detail above by way of example. For example, improved voltage to frequency linearity has been achieved by the inventor herein using synchronous voltage to frequency conversion which, instead of using a time reference based on the pulse width of a monostable multivibrator, uses the period of a relatively high frequency (approximately 2 MHz system clock) to establish the pulse width. In this alternate embodiment, the integrator output is connected to a flip-flop D input and the microcontroller ALE output is connected to the flip-flop clock input. In this alternate configuration, the counter input is connected to the output of an OR gate whose inputs are ALE and the Q* output of the D flip-flop. Voltage to frequency converter IC's are also available as an alternate to the discrete component V to F described hereinbefore. These and other improvements modifications to the present invention which would be readily apparent to those skilled in the art are intended to fall within the scope and spirit of the invention with respect to this enabling disclosure and the claims appended hereto.

Wherefore, having thus described the present invention, what is claimed is:

1. In a digitizer having one or more conductors disposed across an area and an instrument moved across the area to selected positions to be digitized and producing an analog voltage signal having a DC component related to the position of the instrument, the improvement for producing a digital value from the signal dependent on the position of the instrument on the area comprising:
   (a) voltage to frequency conversion means for receiving the analog voltage signal and for converting it to a pulsed signal at a frequency which is a monotonically increasing or decreasing function of the voltage level of the analog voltage signal; and,
   (b) counter means for receiving said pulsed signal from said voltage to frequency conversion means, for counting the pulses of said pulsed signal for an interval, and for producing at an output thereof a digital value proportional to the pulse count whereby said digital value is a monotonically increasing or decreasing function of the voltage level of the analog voltage signal.

2. The improvement to a digitizer of claim 1 and additionally comprising:
   means for resetting said counter means to an initial value at the start of a sampling period.

3. The improvement to a digitizer of claim 1 and additionally comprising:
   means for setting said interval over which said pulses of said pulsed signal are counted.

4. The improvement to a digitizer of claim 1 wherein:
   (a) said voltage to frequency conversion means includes integrator means for producing said pulsed signal as a function of the integral of the voltage level of the analog voltage signal over a variable integration period; and,
   (b) pulse generator means connected to said integrator means for producing a pulse whenever said integrator means reaches a pre-established threshold value.

5. The improvement to a digitizer of claim 4 and additionally comprising:
   feedback means for driving said integrator means to an initial value after each said pulse of said pulse generator means.

6. The improvement to a digitizer of claim 4 wherein said integrator means comprises:
   (a) summing junction means for receiving the voltage level of the signal at a first input thereof and for producing the sum of the inputs at said first input and a second input at an output thereof;
   (b) integrator circuit means having said output of said summing junction means connected to an input thereof and for producing the integrated value of said sum from said summing junction means at an output thereof; and,
   (c) pulse producing means having said output of said integrator circuit means connected to an input thereof and for producing a single pulse at an output thereof whenever the value at said input of said pulse producing means exceeds a pre-established threshold value, said output of said pulse producing means being connected as the input to said counter means, said output of said pulse producing means being also being connected to said second input of said summing junction means.

7. The improvement to a digitizer of claim 6 wherein:
   said pulses produced by said pulse producing means are of a voltage level sufficient even when summed with said analog input signal to cause the voltage level at said output of said summing junction means to be of such polarity as to cause the output of said integrator circuit means to ramp in a direction opposite to that which would be caused by said analog input signal.

8. The improvement to a digitizer of claim 6 wherein said pulse producing means comprises:
   (a) threshold detector means for sensing the value at said input of said pulse producing means and for producing a trigger output when said value exceeds said pre-established threshold value; and,
   (b) one-shot multivibrator means operably connected to said threshold detector means for producing a said pulse at an output thereof whenever it receives a said trigger output from said threshold detector means.

9. The improvement to a digitizer of claim 1 and additionally comprising:
   low pass filter means connected in series with said voltage to frequency conversion means for receiving the analog voltage signal prior to said voltage to frequency conversion means and for removing a portion of any ripple and AC components from the analog voltage signal.

10. An improved digitizer for providing a digital value representing the position of a instrument on a digitizing surface comprising:
    (a) means disposed across the digitizing surface and incorporated into the instrument for, in combination, producing an analog voltage signal having a DC component related to the position of the instrument on the digitizing surface;
    (b) voltage to frequency conversion means for receiving said analog voltage signal and for converting it to a pulsed signal at a frequency which is a monotonically increasing or decreasing function of the voltage level of the analog voltage signal; and,
    (c) counter means for receiving said pulsed signal from said voltage to frequency conversion means, for counting the pulses of said pulsed signal over an interval, and for producing at an output thereof a digital value proportional to the counted pulses whereby said digital value is a monotonically increasing or decreasing function of the voltage level of the analog voltage signal.

11. The digitizer of claim 10 and additionally comprising:
    means for resetting said counter means to an initial value at the start of a sampling period.

12. The digitizer of claim 10 and additionally comprising:
    means for setting said interval over which said pulses are counted.

13. The digitizer of claim 10 wherein:
    said voltage to frequency conversion means includes integrator means for producing said pulsed signal as a function of the integral of said voltage level of said analog voltage signal over a variable integration period.

14. The digitizer of claim 13 and additionally comprising:
    feedback means for driving said integrator means to in initial value after each pulse of said pulsed signal.

15. The digitizer of claim 13 wherein said integrator means comprises:
    (a) summing junction means for receiving said voltage level of said analog voltage signal at a first input thereof and for producing the sum of the inputs at said first input and a second input at an output thereof;

(b) integrator circuit means having said output of said summing junction means connected to an input thereof and for producing the integrated value of the sum from said summing junction means at an output thereof; and, (c) pulse producing means having said output of said integrator circuit means connected to an input thereof and for producing a single pulse at an output thereof whenever the value at said input of said pulse producing means exceeds a pre-established threshold value, said output of said pulse producing means being connected as the input to said counter means, said output of said pulse producing means being also being connected to said second input of said summing junction means.

16. The digitizer of claim 15 wherein:
said pulses produced by said pulse producing means are of a voltage level sufficient even when summed with said analog input signal to cause the voltage level at said output of said summing junction means to be of such polarity as to cause the output of said integrator circuit means to ramp in a direction opposite to that which would be caused by said analog input signal.

17. The digitizer of claim 15 wherein said pulse producing means comprises:
(a) threshold detector means for sensing the value at said input of said pulse producing means and for producing a trigger output when said value exceeds said pre-established threshold value; and,
(b) one-shot multivibrator means operably connected to said threshold detector means for producing a said pulse at an output thereof whenever it receives a said trigger output from said threshold detector means.

18. The improvement to a digitizer of claim 10 and additionally comprising:
low pass filter means connected in series with said voltage to frequency conversion means for receiving said voltage signal prior to said voltage to frequency conversion means and for removing a portion of any ripple and AC components from said voltage signal.

19. In a digitizer having at least one conductor disposed across an area and a instrument moved across the area to selected positions to be digitized and producing an analog voltage signal having a DC component related to the position of the instrument, the improved method for producing a digital value from the signal related to the position of the instrument on the area comprising the steps of:
(a) receiving the analog voltage signal and converting it to a pulsed signal at a frequency which is a monotonically increasing or decreasing function of the voltage level of the analog voltage signal; and,
(b) receiving the pulsed signal, counting the pulses of the pulsed signal over an interval, and producing a digital value proportional to the counted pulses whereby the digital value is a monotonically increasing or decreasing function of the voltage level of the analog voltage signal.

20. The method of claim 19 wherein the interval over which the pulses are counted is a variable interval and additionally including the step of:
initially setting the interval over which the pulses are to be counted.

21. The method of claim 19 and additionally including the step of:
resetting the count of the pulses to an initial value at the start of a sampling period.

22. The method of claim 19 wherein the step of receiving the analog voltage signal and converting it to a pulsed signal includes the step of:
producing the pulsed signal as a function of an integral of the voltage level of the analog voltage signal.

23. The method of claim 22 and additionally comprising the step of:
driving the integrated value to an initial value after each pulse of the pulsed signal.

24. The method of claim 22 wherein the step of producing the pulsed signal as a function of the integral of the voltage level of the analog voltage signal includes the steps of:
(a) receiving the voltage level of the signal at a first input and producing the sum of the inputs at the first input and a second input;
(b) producing the integrated value of the sum of the inputs at the first and second inputs;
(c) producing a single pulse whenever the integrated value of the sum exceeds a pre-established threshold level;
(d) employing the single pulses as the pulsed signal being counted; and,
(e) connecting the pulses being produced to the second input being summed.

25. The method of claim 24 wherein said step of producing a single pulse whenever the integrated value of the sum exceeds a pre-established threshold level includes:
producing pulses of a voltage level sufficient even when summed with the analog input signal to cause the voltage level at the output of the summing junction means to be of such polarity as to cause the output of the integrator circuit means to ramp in a direction opposite to that which would be caused by the analog input signal whereby the integrator circuit means is driven to an initial value after each pulse and continues integrating from the initial value.

26. The method of claim 24 wherein said step of producing a single pulse whenever the integrated value of the sum exceeds a pre-established threshold level comprises the steps of:
(a) sensing the value of the sum and producing a trigger output when the value exceeds the pre-established threshold value; and,
(b) producing a pulse whenever a trigger output is produced.

27. The method of claim 19 and additionally comprising the step of:
connecting a low pass filter to receive the analog voltage signal prior to converting it to a pulsed signal and removing therewith a portion of any ripple and AC components from the analog voltage signal.

* * * * *